United States Patent [19]

Dobler

[11] Patent Number: 4,639,077
[45] Date of Patent: Jan. 27, 1987

[54] COUPLING FOR A LIGHT-CONDUCTING FIBER

[75] Inventor: Thomas Dobler, Windisch, Switzerland

[73] Assignee: BBC Brown, Boveri & Company Limited, Baden, Switzerland

[21] Appl. No.: 632,429

[22] Filed: Jul. 19, 1984

[30] Foreign Application Priority Data

Jul. 21, 1983 [CH] Switzerland ............... 3993/83

[51] Int. Cl.$^4$ ................................. G02B 6/36
[52] U.S. Cl. ................... 350/96.20; 357/17; 357/81
[58] Field of Search .......... 350/96.15, 96.17, 96.18, 350/96.20; 250/227, 552; 357/17, 19, 30, 74, 80, 81

[56] References Cited

U.S. PATENT DOCUMENTS

| 4,186,995 | 2/1980 | Schumacher | 350/96.20 |
| 4,186,996 | 2/1980 | Bowen et al. | 350/96.20 |
| 4,285,572 | 8/1981 | Beaudette et al. | 350/96.20 |
| 4,399,453 | 8/1983 | Berg et al. | 357/81 |
| 4,461,538 | 7/1984 | Breed, III et al. | 350/96.20 |

FOREIGN PATENT DOCUMENTS

| 2618095 | 11/1977 | Fed. Rep. of Germany | 350/96.20 |
| 2907401 | 9/1979 | Fed. Rep. of Germany | 350/96.20 |
| 54-104356 | 8/1979 | Japan | 350/96.20 |

Primary Examiner—John Lee
Attorney, Agent, or Firm—Oblon, Fisher, Spivak, McClelland, & Maier

[57] ABSTRACT

A coupling for a light-conducting fiber, including a metal coupling body, a first device for holding a light-conducting fiber disposed in one side of the metal body and, a second device for holding an opto-electronic transmitting element provided in the other side of the metal body. An opto-electronic transmitting element located in a housing is thermally coupled to the coupling body via a metal cap placed on the housing. As a result of this coupling, the thermal loading of the transmitting element is considerably reduced. For purposes of electrical isolation, an insulating layer can be additionally applied between the metal cap and the coupling body.

12 Claims, 1 Drawing Figure

COUPLING FOR A LIGHT-CONDUCTING FIBER

BACKGROUND OF THE INVENTION

1. Field of the Invention

The invention relates to a coupling for a light-conducting fiber, including a metal body, in which is disposed a first device for holding an end piece of a light conducting fiber, a housing for an opto-electronic transmitting element, and a second device for holding the opto-electronic transmitting element in its housing such that an exit opening of the element is opposite an end face of the fiber.

2. Description of the Prior Art

Couplings of the abovenoted type have been known for some time from the technology of optical data transmission. The opto-electronic transmitting element used has an optical axis extending in a direction which is the preferred direction for emitting the light signals. The light-conducting fiber, having an end face into which the optical signals are to be coupled, also has its own optical axis which is fixed by a device in the coupling. For protecting the active part of the opto-electronic transmitting element, the latter is built into a closed housing into which an exit opening for the light signals is recessed, mostly at the front.

Because of the production conditions, displacements of up to 0.5 mm usually occur in the opto-electronic transmitting elements in the housing between the optical axis and the housing axis, which displacements must be taken into consideration when installing the completed element into a coupling. In order to achieve optimum coupling of light into the light-conducting fiber, it is essential, therefore, to align the transmitting element in the coupling with reference to the optical axis of the light-conducting fiber and, following that, fix the transmitting element in the aligned position.

Usually, this is done by centering the transmitting element in its housing in the holding fixture of the coupling, which has sufficient clearance both in the axial and in the radial direction, having regard to optimum coupling and then potting it with an adhesive.

In a coupling produced in this manner, the housing of the transmitting element is joined to the coupling body only via the adhesive or at the most via gas-filled cavities created during the potting. This adds to the, in most cases desired, electrical insulation of the transmitting element with respect to the coupling body, and to a thermal insulation which impedes dissipation of the heat, produced in the transmitting element, to the metallic coupling body. This structure can lead to thermal overloading of the transmitting element, especially under extreme environmental conditions. Since thermal overloading, however, considerably reduces the life of the transmitting element and thus causes outages in the operation of whole transmission sections, ways must be found for reducing this risk factor in optical data transmission. Since the couplings are used in greater numbers in a transmission network, the required improvements must also not have any significant effect on the production costs.

SUMMARY OF THE INVENTION

Accordingly, the objects of this invention are to provide a novel coupling for a light-conducting fiber which ensures improved heat dissipation from the opto-electronic transmitting element to the coupling body and the production of which is at the same time simple and inexpensive.

These and other objects are achieved according to the invention by providing a novel coupling of the type mentioned initially, wherein the opto-electronic transmitting element is fitted into a metal cap, the metal cap has a through-hole for the optical connection between the exit opening of the housing for the opto-electronic transmitting element and end face of the fiber, the opto-electronic transmitting element is thermally coupled via the metal cap to the coupling body in order to improve heat dissipation, and the thermal resistance between the housing and the coupling body is less than 100° C./W.

The additional metal cap which absorbs the heat flow from the housing of the opto-electronic transmitting element and passes it on to the coupling body has the special advantage that it can be adapted to a plurality of commercially available transmitting-element housings and coupling bodies both with regard to geometric dimensions and with regard to the thermal properties of the material, and is very simple and inexpensive to produce.

In addition, the metal cap can be used, in cases in which a specified distance is required between the end face of the light-conducting fiber and the transmitting element, directly for fixing this distance.

In particular, the metal cap makes it possible to provide, independently of the nature of the transmitting-element housing, at the front face of the latter, a heat-transfer area which can be optimized with regard to heat transfer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein.

DESCRIPTION OF THE PREFERRED EMBODIMENTS

Figure 1:
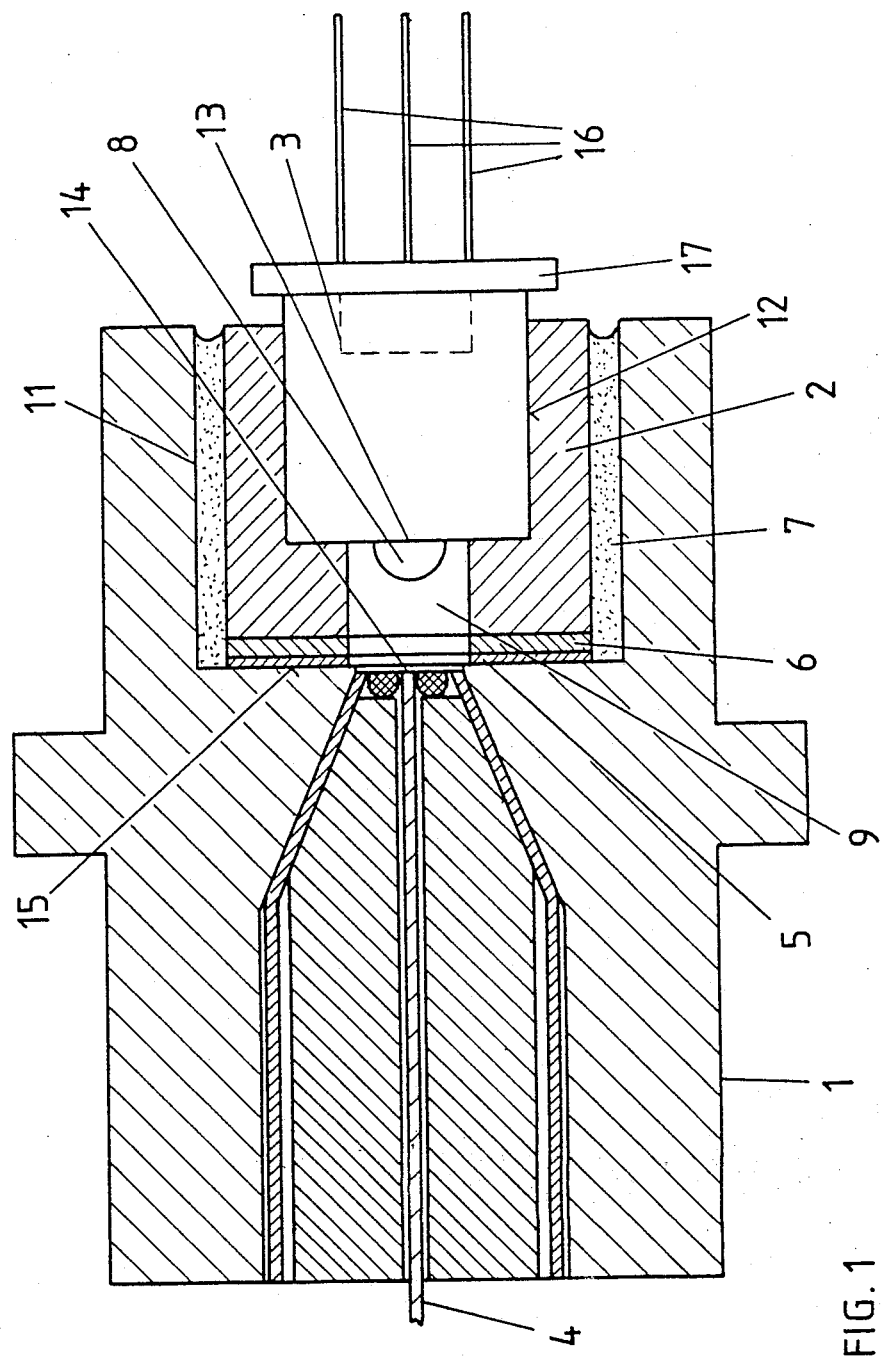
FIG. 1 is a cross-sectional longitudinal view of an illustrative embodiment of a coupling according to the invention.

Referring now to FIG. 1 there is shown an illustrative embodiment of a coupling with improved heat dissipation. The coupling contains as the main part a metal coupling body 1 into which a first device for holding the end piece of a light-conducting fiber 4 is recessed. This first device is of different construction in the various couplings on the market and will not, therefore, be described in closer detail. An end face 14 of the light-conducting fiber 4 fixed in the first device ends inside the coupling body 1 at about the same level as the bottom 15 of a blind hole 11 which extends from the other side into the coupling body 1. The hole 11 makes the end face 14 optically accessible through an opening in the bottom 15.

The blind hole 11 is used for accommodating an opto-electronic transmitting element 3 which is housed, for the protection of an active part thereof, in a largely closed housing 12. The housing 12 usually consists of sheet metal with a refined surface but can also be produced of another material, for example synthetic resin, in special cases. At the front of the housing 12 an exit opening 13 is located for the light signals emitted. For the focussing of divergent light beams, a focussing lens 8 having a 13 the coupling focus of which lens is located outside the housing 12 in the end face 14 is frequently provided in the exit opening 13. Connecting wires 16 for the electric supply of the opto-electronic transmitting element 3 are carried outside through a housing bottom 17 located opposite to the exit opening 13.

The housing 12 of the opto-electronic transmitting element 3, preferably a transmitting diode, is fitted into a metal cap 2. This fitting is preferably executed as a light press fit in order to ensure good heat transfer between housing 12 and metal cap 2. In this arrangement, the housing 12 is recessed as far as possible into the metal cap so that the predominating part of the housing surface is in contact with the metal cap. It is also favorable to use a part of the housing end faces for heat dissipation.

The metal cap 2 consists of a material which, on the one hand, has a heat conductivity which is as high as possible and, on the other hand, matches the material of the housing 12 with regard to heat expansion. Thus, if the housing 12 is manufactured, for example, of brass plate, good results are achieved with a metal cap 2 of brass or copper. The matching of the coefficients of expansion prevents the heat transfer between housing 12 and metal cap 2 from deteriorating with greater temperature fluctuations.

Towards the front, the metal cap 2 is provided with a through-hole 9 through which the light signals can pass from the exit opening 13 to the end face 14 of the light-conducting fiber 4. The front face of the metal cap 2 is thermally coupled to the bottom 15 of the blind hole 11. In the illustrative embodiment of FIG. 1, this coupling takes place via an electrically insulating layer 6 and a subsequent layer 5 of a heat-conducting paste. In other cases, however, another layer of heat-conducting paste can also be provided between the insulating layer 6 and the front face in order to even out unevenness in the adjacent surfaces. In every case, the thermal resistance between the housing 12 and the coupling body 1 should be less than 100° C./W in order to ensure reliable dissipation of the heat from the transmitting element to the environment.

The insulating layer 6 consists of an electrically insulating material having a comparatively good thermal conductivity such as, for example, beryllium oxide or mica. Such insulating layers are known to the expert from power electronics and are there used as an insulating intermediate layer between a power semi-conductor and its heat sink. Similarly, plastic foils can be used, which are commercially available under the name of "MYLAR". The use of foils sold by Thermalloy Inc. under the tradename "THERMAFILM" has been particularly successful and they meet the American Military Specification Mil-P 46 112. In applications in which a dielectric strength of the insulation of the order of magnitude of only a few volts is sufficient, it is particularly advantageous to construct the insulating layer 6 in a thickness of less than 0.1 mm in order to keep the influence of the layer on the heat transfer as small as possible.

For the same reasons, the layer 5 of heat-conducting paste should also be as thin as possible and its thickness should be selected to be such that the surface roughnesses and unevennesses of the adjoining heat-transfer areas are reliably evened out and a good match is achieved over the whole available area. These requirements are met if, before assembly of the coupling, the side of the insulating layer 6 facing the light-conducting fiber 4 is thinly and evenly covered with the heat-conducting paste and after insertion of the metal cap 2 into the blind hole 11, the metal cap with the intermediate layers 5 and 6 is pressed with light pressure in the direction of the optical axis against the coupling body 1 and is fixed under pressure by means of an adhesive.

As a heat-conducting paste, one of the pastes known to the expert from power electronics is again suitable. The silicon-based heat-conducting pastes are particularly advantageous because of their thermal and chemical properties. It is also possible to use a high-viscosity heat-conducting oil instead of a paste.

The opto-electronic transmitting element 3 and the enclosing metal cap 2 are fixed in the blind hole 11 of the coupling body 1 by filling adhesive 7 into the spaces, remaining free after the alignment, between the metal cap and the coupling body. The selection of the adhesive with regard to thermal stability, thermal behavior and the necessary hardening process can be made by the expert in accordance with the requirements which are created by the later application of the coupling and which are affected by the limiting parameters of the opto-electronic transmitting element used. Thus, the possibility exists, for example, of using a metal-filled epoxy resin in order to achieve additional improvement in the lateral heat transfer to the coupling body.

In the illustrative embodiment shown in FIG. 1 in which a focussing lens 8 is used in the exit opening 13, optimum coupling of light into the end face 14 is achieved only if a specified distance is established between the end face and the plane of the lens. Whereas with the previously known couplings, this distance was first set during the alignment and then fixed by the adhesive, the setting is here advantageously already predetermined, and also fixed, by the specially selected dimensions of the metal cap 2, taking into consideration the thickness of any insulating layers 6. This limits the alignment process to the axes perpendicular to the optical axis and considerably facilitates this process.

Overall, it has been found to be advantageous to select the thermal resistance between the housing 12 and the coupling body 1, which is determined by the type of the heat-transfer areas and the metal cap 2, to be smaller than or approximately equal to the thermal resistance between the opto-electronic transmitting element 3 and its housing 12. The total thermal conduction from the transmitting element to the environment is then essentially determined only by the predetermined, internal structure of the transmitting element in its housing and can no longer be decisively improved by external measures.

The illustrative embodiment of FIG. 1 shows the special case of a coupling with electrical isolation between the housing 12 of the opto-electronic transmitting element 3 and the coupling body 1. However, if such electrical isolation is not necessary, the insulating layer 6 can be omitted and the metal cap 2 coupled to the coupling body only via the layer 5. Similarly, other shapes of the metal cap 2 are advantageous, in modification of the shape of FIG. 1, if the coupling body 1 and the housing 12 are constructed in a different manner. This modification can be carried out without difficulty by the expert within the context of the present invention.

EXAMPLE

Infrared transmitting diodes of the ASEA type 1a 124 and 1A 137, emitting light at 860 and 900 nm, respectively, were used to carry out tests in which the diodes, on the one hand, were molded in previously disclosed manner into the coupling body and, on the other hand, were thermally coupled to the coupling body via a metal cap, a 0.06 mm thick "Thermafilm" foil and an intermediate layer of heat-conducting paste. In all cases, the diodes were operated with a current of 100 mA and consumed a power of about 150 mW.

Without metal cap and thermal coupling, the housing temperature rose to over 50° C., starting from about 20° C. at switch-on, and did not reach a steady-state value.

With the thermal coupling via the metal cap and identical starting conditions, an increase in housing temperature by only 3° C. was measured. This increase settled as a steady-state value.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A coupling for a light-conducting fiber having an end piece, comprising:
    a metal coupling body;
    a first device mounted in the coupling body and adapted for holding the end piece of said light-conducting fiber;
    an opto-electronic transmitting element mounted in a housing having an exit opening for light to be emitted by said element;
    a metal cap for holding the opto-electronic transmitting element such that the exit opening is adapted to be opposite to an end face of the light-conducting fiber, said opto-electronic transmitting element fitted into said metal cap and having a through-hole for providing an optical connection between said exit opening and said fiber end face;
    said opto-electronic transmitting element thermally coupled via said metal cap to the coupling body in order to improve heat dissipation; and
    said housing and said coupling body defining therebetween a thermal resistance less than 100° C./W.

2. A coupling according to claim 1, comprising:
    said coupling body having a blind hole in which said metal cap is disposed, and
    said metal cap having a front face thermally coupled to a bottom of the blind hole.

3. A coupling according to claim 2, comprising:
    a layer of heat-conducting paste provided between the front face and the bottom of the blind hole.

4. A coupling according to claim 3, wherein said layer of heat-conducting paste comprises:
    a silicon-based paste.

5. A coupling according to claim 2, comprising:
    said metal cap and the housing of the opto-electronic transmitting element electrically insulated from the coupling body outside said front face of said metal cap, and
    an insulating layer provided between the front face of the metal cap and the bottom of the blind hole.

6. A coupling according to claim 5, wherein said insulating layer comprises:
    a heat conducting foil.

7. A coupling according to claim 6, wherein the thickness of the insulating layer is less than 0.1 mm.

8. A coupling according to claim 2, comprising:
    said blind hole having dimensions larger than that of said metal cap for the purpose of aligning the optical axes of said fiber and of said transmitting element; and
    said metal cap laterally fixed in the blind hole by means of an adhesive filling.

9. A coupling according to claim 1, wherein said opto-electronic transmitting element is fitted into said metal cap with a light press fit.

10. A coupling according to claim 1, wherein the metal cap comprises:
    a metal having a coefficient of thermal expansion matched to that of the housing.

11. A coupling according to claim 1, wherein the housing and the coupling body define a thermal resistance therebetween which is less than or approximately equal to a thermal resistance between the opto-electronic transmitting element and the housing.

12. A coupling according to claim 1, comprising:
    said opto-electronic transmitting element being an optical transmitting diode;
    a focussing lens mounted in said exit opening and defining a coupling focus which is outside the housing; and
    a distance between the focussing lens and the end face of the light-conducting fiber being fixed by the metal cap in such a manner that the coupling focus is approximately in said end face of said fiber.

* * * * *